US005379503A

United States Patent [19]

Fakult

[11] Patent Number: 5,379,503

[45] Date of Patent: Jan. 10, 1995

[54] EXTRACTION TOOL FOR TRANSMISSIONS

[75] Inventor: William J. Fakult, Eastlake, Ohio

[73] Assignee: Roy-Con Tool & Mfg., Inc., Eastlake, Ohio

[21] Appl. No.: 58,388

[22] Filed: May 10, 1993

[51] Int. Cl.[6] ........ B23P 19/04

[52] U.S. Cl. ........ 29/265

[58] Field of Search ........ 29/263, 265, 282; 269/48.1; 242/72 R

[56] References Cited

U.S. PATENT DOCUMENTS

| | | | |
|---|---|---|---|
| 2,671,263 | 3/1954 | Hamilton | 29/265 |
| 2,899,741 | 8/1959 | Dunkerley | 29/263 |
| 3,055,093 | 9/1962 | Ruble | 29/265 |
| 3,327,377 | 6/1967 | German | 29/263 |
| 3,986,383 | 10/1976 | Petteys | 29/263 |
| 4,050,136 | 9/1977 | Shultz | 29/265 |
| 4,104,775 | 8/1978 | Lawless | 29/265 |
| 4,724,608 | 2/1988 | Parrott | 29/263 |

*Primary Examiner*—Robert C. Watson
*Attorney, Agent, or Firm*—Frank B. Robb

[57] ABSTRACT

An extraction tool for transmission or the like units comprising a long tubular body enclosing a rotatably mounted operating part having an expansible gripping unit at one end to engage withing a mating part, and a handle at the opposite end to rotate the operating part to cause the gripping unit to in turn grip said mating part to facilitate withdrawal of clutch and gear units or the like in which the mating part is positioned.

3 Claims, 2 Drawing Sheets

EXTRACTION TOOL FOR TRANSMISSIONS

BACKGROUND OF THE INVENTION

This invention relates primarily to what may be termed an extraction device or means for withdrawing clutch and gear units or the like which are stacked in transmission housings that are availed of for automotive use.

In automotive transmissions there is usually provided a series of clutches and gears which are concentrically arranged and when repairs are required are most often removed in some manner from a housing in which they normally operate.

Since the housing is an enclosure which is open only at one end for removing and replacing clutches and gears for example, some difficulty may be present to maintain the aligned relationship in which they are positioned in the housing.

Inasmuch as there is only one entrance so to speak, through which the clutches and gears are installed and removed, they musty be removed from that opening and it is desirable to lift them all at once, and thus the advantage of the tool hereof is particularly valuable.

There are tools on the market which will perform the removal in several operations, but they fail to maintain the axial alignment of the clutches and gears which is desirable and do not support removal of certain hollow shaft assemblies without removal of the entire stack of clutches and gears.

Another factor which causes problems in clutch removal, is that the central openings in such stacks are desirably maintained in continuous alignment while removing and installing, which is compounded by the fact that the housing has only the single opening, which in turn means that the central openings in the stack terminate effectively in a blind hole and thus access is only possible from the single opening provided.

GENERAL DESCRIPTION OF THE INVENTION

In order to accommodate for the problems suggested by the foregoing, a single tool is provided hereby which includes means to lift an entire stack of clutches and gears and when desired, less than the entire stack, even as little as a hollow shaft on which clutches and gears or the like may be supported for use of the transmission.

The tool hereof may be termed an extraction tool comprising an elongated tubular body, having an operating part with an upper threaded portion and a lower threaded section, the latter having an expansion unit which is capable of gripping internally of a hollow part, the operating part having a handle which when rotated will cause the expansion unit to effect its gripping action, and enable a stack of clutches and gears in which the tool is positioned to be lifted in a single movement from within the housing.

DETAILED DESCRIPTION OF THE INVENTION

Turning to a detailed description of the invention, it is useful to relate the same to the disclosure in the drawing wherein.

Figure 1:
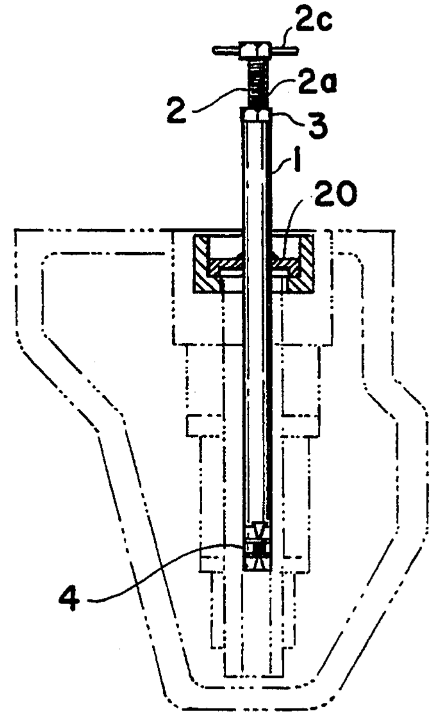
FIG. 1 shows the tool hereof in position in a phantom elevation of a transmission and housing.
Figure 2:
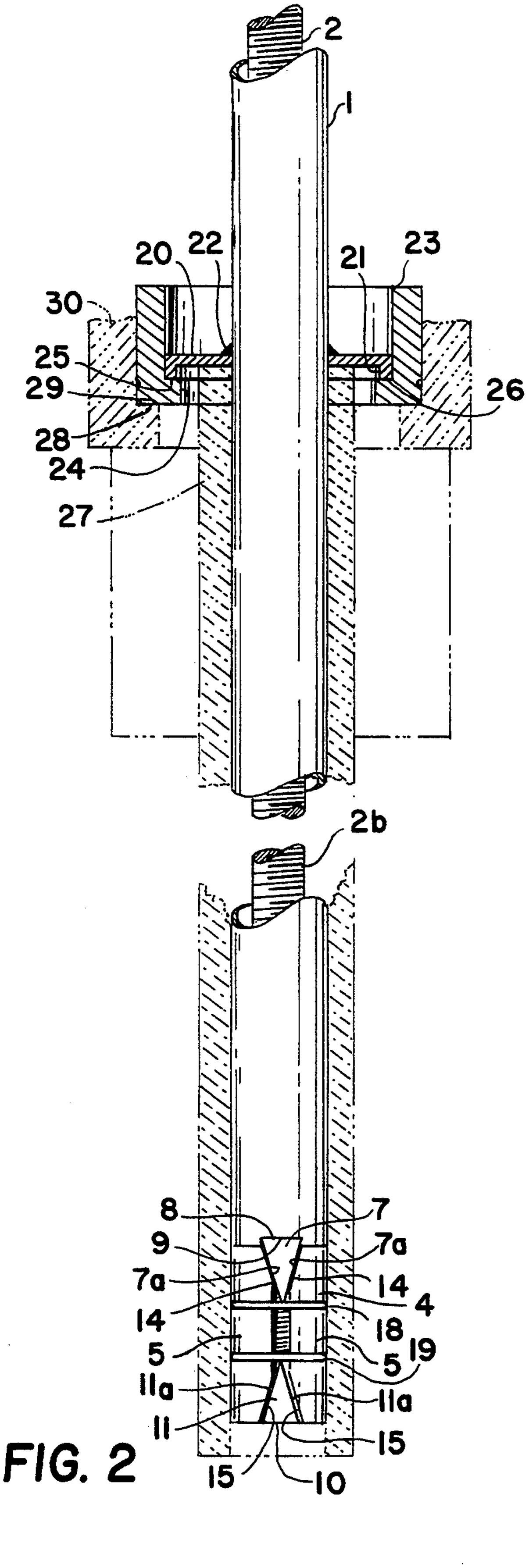
FIG. 2 is a fragmentary view partly in section showing certain details of the tool.

As disclosed in FIGS. 1 and 2, the tool hereof comprises an elongated tubular body 1, a substantially coextensive operating part 2, including an upper threaded portion *2a* and a lower threaded section *2b*.

A nut 3 is pinned to threaded portion *2a* at the upper end of the body 1 to rotate therewith, a handle *2c* mounted at the end of the section, being provided to rotate the part 2 as will be subsequently described.

Figure 6:
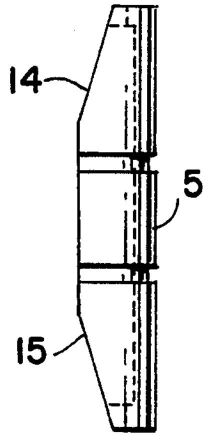
FIG. 6 is a view in side elevation of a segment used in the lower end of the tool.
Figure 7:
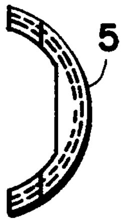
FIG. 7 is an end view of the part shown in FIG. 6.
Figure 8:
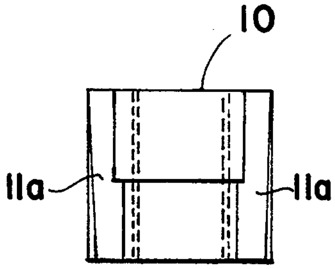
FIG. 8 is a side view of a ramp or expansion part.
Figure 9:
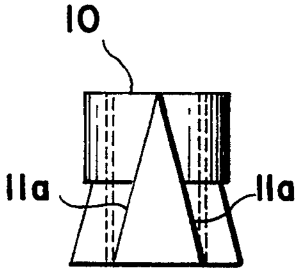
FIG. 9 is a view taken at ninety degrees from the disclosure of FIG. 8.
Figure 10:
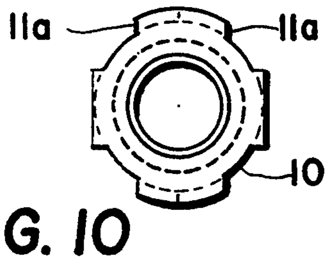
FIG. 10 is an end view of the part shown in FIGS. 8 and 9.

At the lower end of the part 2, an expansion or gripping unit 4 is positioned, said unit 4 including a pair of substantially identical segments 5 one of which is shown in FIGS. 6 and 7, two of which together surround the section *2b* through spaced therefrom.

A first expansion or ramp part 6 of generally conical shape is freely rotatably mounted on the section *2b*, and within the segments 5. The part 6 includes triangularly shaped ramp portions 7 diametrically disposed on the part, the upper ends 8 of the portions 7 being received in notches 9 at the lower end of the body 1.

A second expansion or ramp part 10 substantially identical to the part 6, is oppositely mounted on and threadedly engaged with the section *2b*, in this instance at a predetermined spacing from part 6. It also includes diametrically opposite triangular shaped portions 11.

Intermediate the parts 6 and 10, a collar 12 is fastened by a pin 13 to the threaded section *2b* of the operating part 2.

As previously stated, segments 5 are positioned so as to surround the parts 6 and 10.

These segments 5 have ramp formation 14 at one end and 15 at the other, provided in pairs, corresponding formations 14 being positioned in alignment with the respective formations *7a* of the ramp part 6 and formations 15 being positioned in alignment with respective formations *11a* of the part 10.

It should be apparent from the foregoing that the part 10, threaded as it is to the threaded section *2b*, will be caused to move upwardly or downwardly, depending upon the direction of rotation of the part 1.

Figure 4:
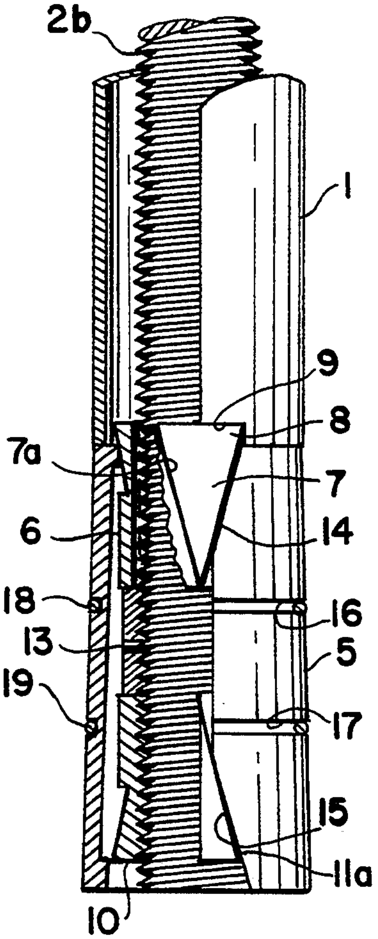
FIG. 4 is an elevational view of the tool hereof, partly in section and fragmentary in nature, in gripping position.
Figure 5:
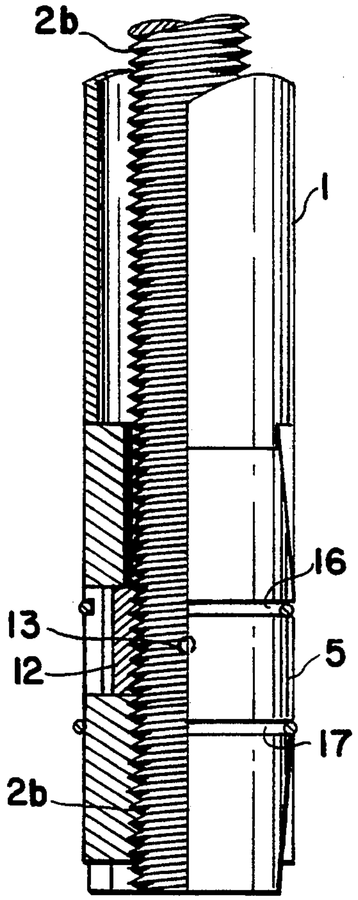
FIG. 5 is another detailed fragmentary sectional view of a portion of the lower end of the tool.

When the part 10 moves upwardly as viewed in FIG. 4, the respective formations 15 will cause the corresponding formations *11a* to expand the segments 5, to the extent permitted by the opening in which the gripping unit 4 as a whole is positioned.

Further rotation of the part *2b* will result in interaction of the ramp formations of the part 6 and segments formations 14 causing expanding movement likewise, whereby the segments as a whole will grip in the opening in which the unit 4 is positioned.

Suitably formed and positioned in grooves 16 and 17, spring rings 18 and 19 respectively will normally retain the segments 5 in position.

Said rings 18 and 19 will also cause the segments to return to their original positions when the threaded operating part is appropriately rotated.

It is particularly noted that the segments 5 partake of a sort of rocking action during upward movement of part 10 to cause gripping action by the entire unit 4.

Figure 3:
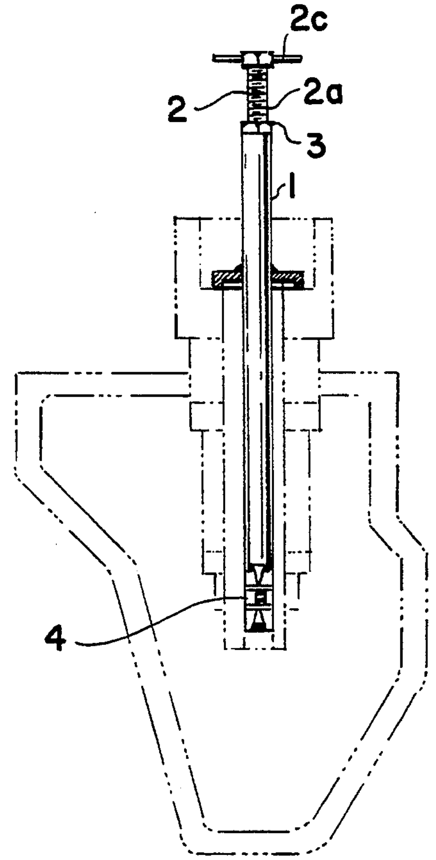
FIG. 3, is a view like FIG. 1, showing the tool in position as withdrawing a stack of clutches and gears from a housing.

It should be apparent that appropriate manipulation imparted to the part 2 will result in corresponding gripping and relaxing action of the segments to enable removal of a stack A of clutches and gears from a transmission housing as suggested by FIG. 3.

The same position shown in FIG. 3 will also suggest replacement of the stack as well.

The tool hereof is further provided with means to withdraw a hollow shaft or the like from an assembly such as the stack of clutches and gears in a transmission housing.

Those means, generally designated 20, shown in somewhat enlarged detail in FIG. 2, include a shoulder part 21 of inverted cup shape, secured as by welding to the tubular body 1, near the upper end as indicated at 22.

There is also provided a bearing support 23, which is likewise of upwardly open cup shape, having a central bore 24 which leaves a shoulder 25 upon which the opposed portion 26 of the shoulder part 21 is supported to provide a bearing area during manipulation of the tool as now to be described.

Again referring to FIG. 2, it will be seen that a hollow shaft 27 is shown, which shaft provides a support for the stack of clutches and gears normally mounted thereon. Those clutches and gears are not shown but are part of a usual transmission, as will be apparent to those skilled in the art.

The bearing support 23 is placed in position with the lower peripheral surface 28 resting on a shoulder 29 of an upper clutch and gear unit 30 for example.

Thereafter, the tool hereof is positioned with the body 1 extending downwardly into the assembly of clutches and gears and the shoulder part 21 resting on the shoulder 29 of the support 23.

Subsequent rotation of the handle 2*c* of the tool, will cause an expanding action of the segments 5 of the expansion unit 4, resulting in a gripping action thereof, within the hollow shaft 27.

Continued rotation of the handle 2*c* when the segments 5 have attained their maximum grip will cause the shaft 27 to be drawn upwardly, facilitating its ultimate withdrawal without at the same time a change in position of the clutch and gear stack surrounding the shaft 27, since the hollow shaft only bears in the stack for a limited distance, in usual constructions.

It will be understood that the clutch and gear stack may be removed in its entirety if the handle 2*c* is only initially rotated enough to cause the expansion unit 4 to grip the stack and not to remove the hollow shaft.

The clutch and gear stack may be re-positioned within the housing by use of the handle to lower the stack within the housing, whilst the expansion unit is in gripping position, as will be readily understood.

The relaxing of the expansion unit will enable the tool to be removed from within the stack for further assembly of the transmission.

I claim:

1. An extraction tool comprising an elongated tubular body, a substantially coextensive operating part having an upper threaded portion and a lower threaded section, a mating nut part at the upper end of the body fixed on the threads and bearing against the upper end of the body, and an expansion unit mounted on the lower threaded section, whereby rotation of the operating part will cause the expansion unit to internally grip a tubular part of a transmission or the like to facilitate withdrawal of certain of the internal parts carried on the tubular transmission or like part, the tubular body is provided with a wide shoulder member fixed near the upper end of the body, a bearing support is positioned to engage the shoulder member and a bearing area of a transmission unit or the like, whereby initial rotation of the operating part will effect an initial predetermined gripping engagement of the expansion unit and further rotation of the part will effect a lifting action of the unit within which the unit is positioned.

2. A tool as claimed in claim 1, wherein the expansion unit includes a pair of substantially identical segments surrounding a pair of expansion parts, the segmments having ramp formations on each, coextensive with complementary formations of the expansion parts aforesaid, the expansion parts being mounted on and at least one being responsive to rotation of the part, whereby the segments will move expansively and grip the lower unit is stated.

3. A tool as claimed in claim 2, wherein spring parts surround the segments, to cause the same to relax from gripping position when the operating part is appropriately rotated.

* * * * *